United States Patent

Weber

[15] 3,693,016

[45] Sept. 19, 1972

[54] SEMI-CONDUCTIVE APPARATUS FOR DETECTING LIGHT OF GIVEN FLUX DENSITY LEVELS

[72] Inventor: Paul E. Weber, Libertyville, Ill.

[73] Assignee: Bell & Howell Company, Chicago, Ill.

[22] Filed: May 24, 1971

[21] Appl. No.: 146,563

Related U.S. Application Data

[63] Continuation of Ser. No. 817,749, April 21, 1969, abandoned.

[52] U.S. Cl. ............................250/211 J, 317/235 N

[51] Int. Cl. ..............................................H01l 15/00

[58] Field of Search ...250/211 J; 317/235 N, 235 W; 307/310, 311, 117

[56] References Cited

UNITED STATES PATENTS

| | | | |
|---|---|---|---|
| 3,036,234 | 5/1962 | Dacey | 250/211 J X |
| 3,443,102 | 5/1969 | Kaye | 250/211 J X |
| 3,448,275 | 6/1969 | Hall | 317/235 N X |
| 3,484,663 | 12/1969 | Halus | 317/235 N |
| 3,517,199 | 6/1970 | Cochran | 307/311 X |
| 3,534,231 | 10/1970 | Biard | 250/211 J X |

OTHER PUBLICATIONS

Stocker et al., RCA Technical Notes No. 536; March, 1962; 2 pp.

*Primary Examiner*—Walter Stolwein
*Attorney*—Jack H. Hall

[57] ABSTRACT

Apparatus for detecting light having at least a given flux density level and for discriminating between light of said given level and all other low levels of light regardless of their total illumination flux value. The apparatus comprises a PNP silicon conductor sandwich having a front side consisting of a photodiode and a back side consisting of a conventional diode. A battery and resistor are serially connected to the integrated circuit combination, and a signalling current flows through the resistor only when light having at least said given flux density level impinges a target surface of the photodiode.

7 Claims, 6 Drawing Figures

Inventor:
Paul E. Weber.

By Jack H. Hall Atty

Inventor:
Paul E. Weber

By Jack H Hall Atty

SEMI-CONDUCTIVE APPARATUS FOR DETECTING LIGHT OF GIVEN FLUX DENSITY LEVELS

This is a continuation of Ser. No. 817,749 filed Apr. 21, 1969, now abandoned.

FIELD OF THE INVENTION

This invention relates in general to apparatus for detecting light having a given flux density level. In particular, this invention relates to semi-conductive apparatus suitable for use in holography for detecting light having at least a given flux density level, and for discriminating between light of said given level and all other low levels of light regardless of their total illumination flux value.

DESCRIPTION OF THE PRIOR ART

In the art of holography, holographic images are typically constructed on a photographic plate by forming an interference pattern by directing a beam of laser light through given information and combining the existing beam with a reference beam of laser light transmitted directly from the laser to the photographic plate.

In other applications of holography, a recognition system may be employed to locate information stored in a file in microfiche or in microfilm form by recognizing certain characters or groups of characters from the filed information. Using this recognition system, a holographic record of the certain characters or groups of characters is employed as a spacial filter. In this application, the most immediate result of recognizing the desired characters is a minute spot of light having a high flux density level. The invention is specifically directed to detecting the appearance of this spot of light.

The size of the light spot may vary between a diameter of ½ to 1 mm, depending upon the quantity of information which is desired to be recognized or "pulled" from the file. The exact location of the light spot is irrelevant and may vary over a large area of a target detection surface. The detection surface may also be subjected to incidental light from other sources.

A vidicon having its photoconductive face positioned in the path of the beam forming the light spot may be used to detect the occurrence of the minute spot of light. In using a vidicon, the tube is constantly scanned by electron beam scanning and the spot of light having a given flux density level produces an electrical signal which is subsequently clipped by suitable electrical means to trigger a device indicating that the particular information has been located.

Unfortunately, a vidicon light detection system is not only expensive, but is relatively time consuming due to the size of the area required to be scanned by the electron beam.

SUMMARY OF THE INVENTION

This invention obviates the problems and deficiencies of vidicons and other devices in detecting a light spot having at least a given flux density and for discriminating between the light spot and other low levels of light which may have a total light flux illumination level which is greater than the light flux illumination level of the light spot to be detected. By means of the invention, the light may be detected immediately thereby eliminating scanning time.

The apparatus of the invention generally comprises a PNP silicon semiconductor sandwich, the front side of which is a silicon photodiode and the back side of which comprises a simple silicon diode. The PNP sandwich thus comprises an integrated semiconductor device consisting of a photodiode serially connected to a conventional diode. A battery and a resistor are serially connected to the integrated circuit combination and the junction between the photodiode and conventional diode is electrically connected to the junction between the battery and the resistor.

Operationally, current flows only through the path defined by the photodiode and the battery when light having less than a given flux density level impinges on the target detection surface of the photodiode, except for a very small leakage current through the conventional diode. However, when light having at least the given flux density level impinges on the photodiode, a large amount of current flows through the path that includes the conventional diode and the resistor. The current through the resistor may be utilized as an input signal to trigger associated apparatus which may inform the user the desired information has been located. Additional equipment may then be employed to automatically project the located information onto a screen or to permanently reproduce the information in soft copy form. In this manner, a light threshold detection device is provided which only reacts to light from a source having at least a given light flux density level.

Accordingly, it is an object of the present invention to provide a semiconductor detection device for detecting light having at least a given flux density level.

Another object of this invention is to provide a semiconductor device for detecting light having at least a given flux density level while discriminating against all other light which may have a total flux illumination value greater than the flux illumination value of the light to be detected.

It is also an object of this invention to provide a semiconductive detection device for rapidly, accurately, and economically detecting light having at least a given flux density level.

DESCRIPTION OF THE PREFERRED EMBODIMENTS

Figure 1:
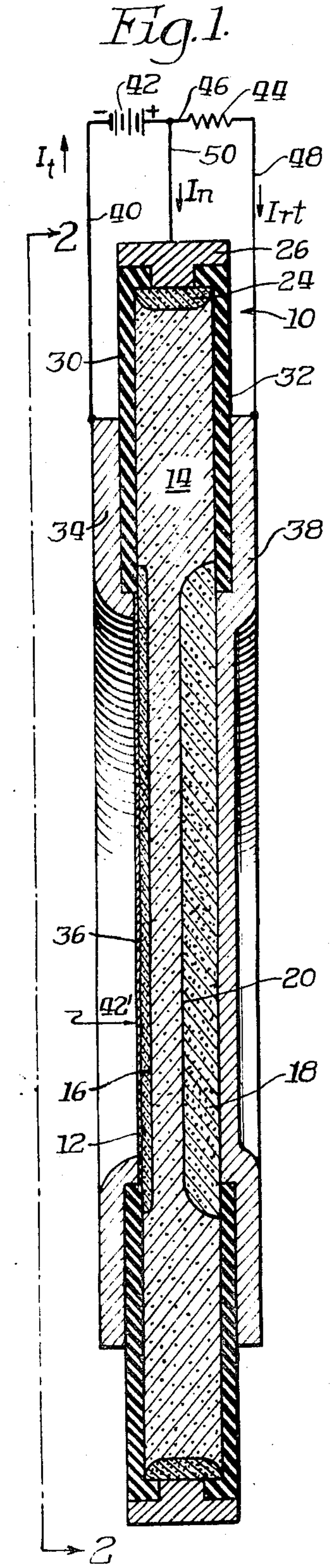
FIG. 1 is a vertical cross-sectional view of the integrated semi-conductor device and its associated electrical circuitry, comprising the invention.
Figure 2:
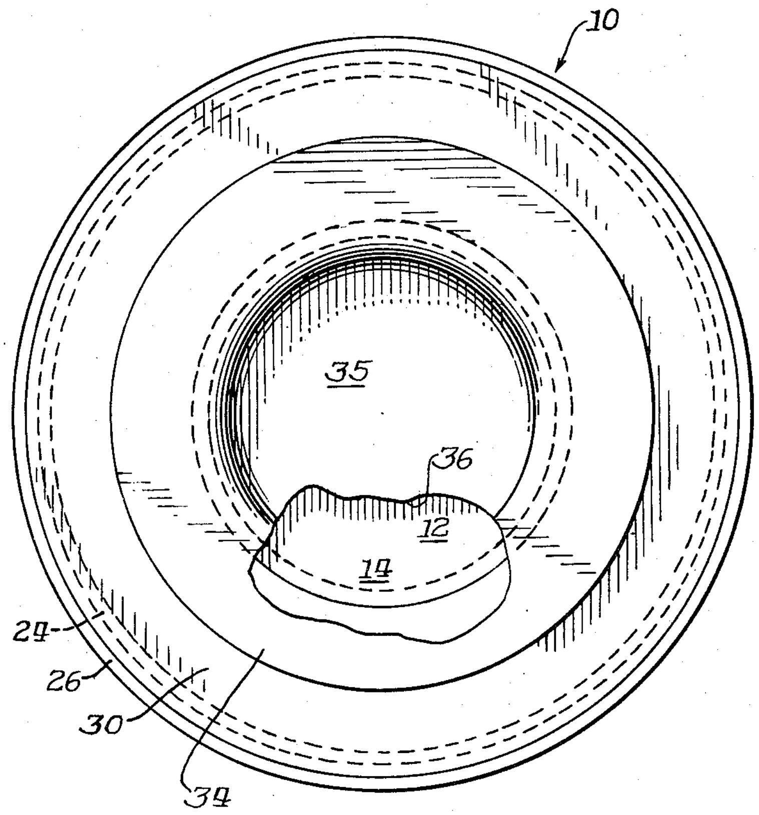
FIG. 2 is a reduced scale front elevational view of the integrated semi-conductor device shown in FIG. 1, taken along line 2—2 thereof with portions broken away for clarity.

Referring to FIG. 1 and 2 of the drawings, a semiconductor device 10 is shown comprising a thin, disc-shaped P-type region 12 and a larger, disc-shaped N-type region 14 separated by a PN junction 16 defining a photodiode. A small disc-shaped P-type region 18 is separated from the N-type region 14 by a NP junction 20 forming a conventional diode. Thus region 14 forms a common cathode shared by both the photodiode and the conventional diode. The diameters of P-type regions 12 and 18 are approximately equal. Each of these P-type regions may be obtained by methods well known in the art such as by doping N-type semiconductor material with a suitable doping agent.

A shallow arcuate depression 22 is provided about the circumferential edge of N-type region 14 for receiving a region 24 comprising $N^+$ type semiconductor material which provides an electrical connection between region 14 and a rim electrode 26. Electrode 26 is characterized by a T-shaped cross section and may be fabricated of suitable conductive material, such as aluminum. $N^+$ type region 24 is interposed between N-region 14 and aluminum electrode 26 because of the incompatability of the N-type silicon used in region 14 and aluminum.

Electrical insulation in the manner of washer-shaped silicon dioxide layers 30 and 32 is provided on the exposed face surface portions of N-type region 14 to electrically insulate these surfaces from front and back electrodes to be described hereinafter. The minor diameter of silicon dioxide washers 30 and 32 is slightly less than the diameter of P-type regions 12 and 18, while the maximum washer diameter is slightly greater than the diameter of N-type region 14. In addition, the two open spaces formed by the T-shaped cross section of rim electrode 26, are filled in with silicon dioxide.

A heavy, ring-shaped front electrode 34 is provided in overlying relation to a circular segment of silicon dioxide insulator 30. Front electrode 34 may be fabricated of aluminum or other suitable material and its inner diameter defines a target area 35 at the exposed surface of P-type region 12.

A light-permeable, thin flash layer 36 of aluminum is provided over the target area to prevent the silicon material from oxidizing. The flash layer is in electrical contact with front electrode 34 and thus also functions as a continuation of this electrode.

The rear surface of semiconductor device 10 is covered by a generally solid back electrode 38 which may also be fabricated of aluminum. Back electrode 38 covers the exposed surface of P-type region 18 and also extends diametrically outward to protect a portion of silicon dioxide insulator 32. It should be noted that the primary function of the silicon dioxide insulators is to electrically insulate the exposed surfaces of N-type region 14 from electrodes 34 and 38.

A lead 40 is provided for electrically connecting front electrode 34 to the negative terminal of a D. C. source such as a battery 42. The positive terminal of battery 42 is connected to a resistor 44 by a lead 46, and the resistor is also serially connected to back electrode 38 by a lead 48. Finally, a lead 50 extends from rim electrode 26 to the junction between the positive terminal of battery 42 and resistor 44.

Figure 3:
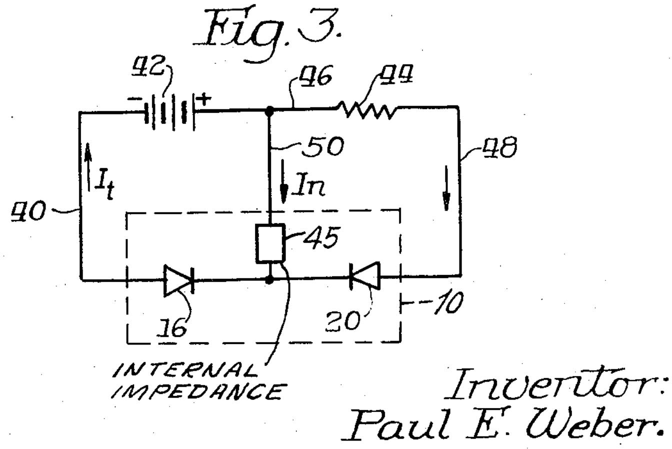
FIG. 3 is a schematic diagram of an equivalent electrical circuit of the device and its associated electrical components, shown in FIG. 1.

Referring now to FIG. 3, in addition to FIGS. 1 and 2, the semiconductor device and its associated components may be schematically represented by a circuit comprising the photodiode 16, the conventional diode 20, the battery 42 and the resistor 44 plus an element 45 which represents the internal impedance of N-type region 14, $N^+$ type region 24 and aluminum electrode 26.

As is well known, the characteristics of a photodiode are such that when a light indicated by arrow 42′ strikes its active surface, such as target surface 35 of P-type region 12, the light struck area of the P-type region emits or donates electrons to the contiguous N-type region 14 causing an electric current to flow through the latter region. Voltage for conventional diode 20 is provided by the biasing voltage of battery 42 passing through a conductive path of P-type region 12 and the area of N-type region 14 coincident with the light struck area of the P-type region.

Figure 4:
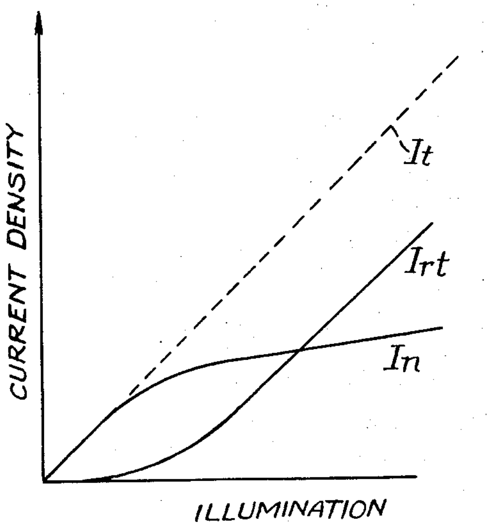
FIG. 4 is a graph of current density for various illumination intensities, during the two different operational stages of the device shown in FIG. 1 and 2.

For low light levels, that is, for light levels having less than a given flux density, an insufficient quantity of electrons are donated to the N-type region to enable the voltage potential created at the NP junction opposite the point where the light impinges, to reach the threshold voltage. In this mode, the current flow is along a path defined by the negative terminal of battery 42, electrode 34, P-type region 12, N-type region 14, and finally to the positive battery terminal through $N^+$type region 24 and rim electrode 26. The current along this path may be referred to as $I_t$ and comprises the total current through photodiode 16 when no current is flowing through conventional diode 20 which condition, for all practical purposes, exists because the leakage current through the conventional diode is very small under the stated conditions. As noted in FIG. 4, the slope of this current on a graph of current density (Amps/cm$^2$) vs. illumination (watts/cm$^2$) is a constant.

When the light flux density impinging on target area 35 reaches a given level, a large quantity of electrons are donated by P-type region 12 and a sufficient potential difference is readily created between the backside of N-type region 14 in the area coincident with the light spot at interface 20, and the P-type layer of conventional diode 20. In this second operational mode, the biasing voltage of battery 42 through the conductive N-type region produces a voltage at the cathode of conventional diode 20 which exceeds its threshold voltage, thereby allowing a large portion of current $I_t$ to flow through diode 20 and along a path defined by electrode 38, resistor 44, battery 42 and the photodiode. The current along this path may be referred to as $I_{rt}$. The current flowing through resistor 44 is what is detected to trigger a signal which in its most primitive form may be a small light bulb, or which in more elaborate forms may comprise the input signal to complex amplification apparatus for controlling other functions associated with the recognition system.

In the second operational mode described immediately above, a current flow is also present through N-type region 14 and rim electrode 26. This current may be referred to as $I_n$. By referring to the graph of FIG. 4, it may be seen that the total current, when the device is operating in its first mode, is equal to the current $I_{rt}$ plus the current $I_n$, when the device operates in its second mode.

In one embodiment of the detection device, the threshold voltage of diode 20 was maintained at 0.4 to 0.5 volts. By varying the biasing voltage of battery 42 various light flux density levels may be detected. Increasing the biasing voltage causes the threshold voltage of diode 20 to be reached at a lower light flux density level.

Figure 5:
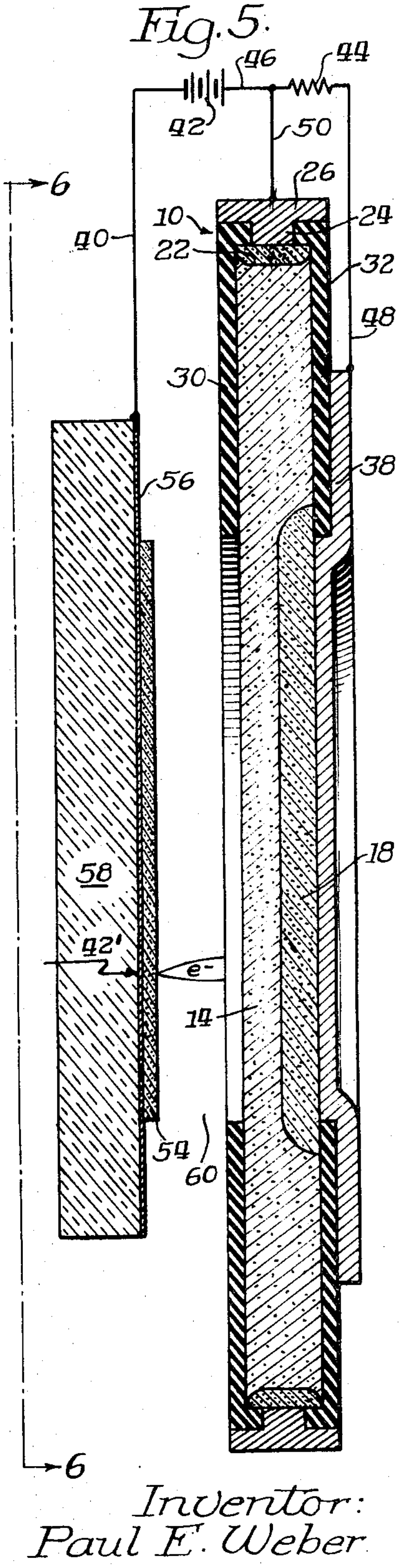
FIG. 5 is a vertical cross-sectional view of an alternate embodiment of the invention.
Figure 6:
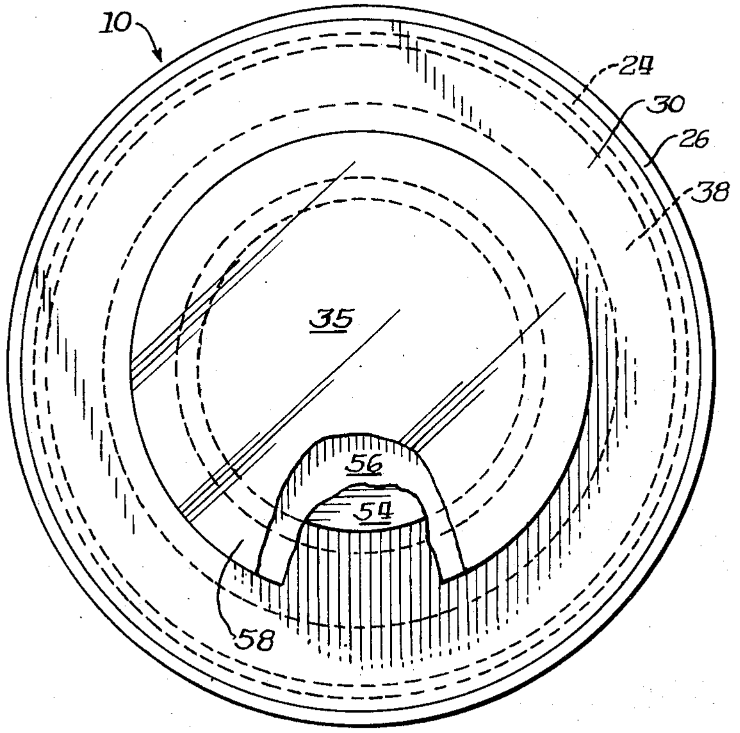
FIG. 6 is a reduced scale elevational view of the alternate embodiment taken along line 6—6 thereof with portions broken away for clarity.

Referring now to the second embodiment of the invention shown in FIGS. 5 and 6, like reference numerals refer to like structure. In this embodiment, an external photoelectric effect is utilized instead of an internal photoelectric effect of the first embodiment. P-type region 12 is omitted, and a photon-electron emitting area 54 having a flash electrode 56 and a glass plate 58, are substituted therefor. The electron flow from region 54 is directed through a space gap 60 between the region 54 and N-type region 14. The entire structure of course is suitably encapsulated in a vacuum to enable the electrons to flow across space 60. The associated electrical apparatus also includes a battery 42 and a resistor 44 which are connected as shown in FIGS. 1, 2 and 3.

What has been described is a photoelectric semiconductor device capable of discriminating between light impinging on a target area which has a large total illumination flux, and light impinging on the area having at least a given flux density level, but which has a smaller total illumination flux value.

While the semiconductor detector devices have been described as disc or circular shaped, it is obvious that square, rectangular or other shapes may be employed without departing from the inventive concept.

Also, it should be understood that the foregoing disclosure relates only to preferred embodiments of the invention and that numerous other modifications or alterations may be made therein without departing from the spirit and scope of the invention as set forth in the appended claims.

I claim:

1. A photoconductive device for detecting light having at least a given flux density level comprising:
 - a semiconductor structure, said semiconductor structure comprising:
 - a first region having P-type conductivity;
 - a second region having N-type conductivity, said first and second regions being separated by a P-N junction; and,
 - a third region exhibiting photo emissive characteristics disposed sufficiently close to said second region to enable electrons donated from said third region in response to light impinging thereon to be accepted by said second region;
 - a DC source of electric potential;
 - a first lead electrically connected between one side of said DC source and said third region;
 - a second lead electrically connected between the other side of said DC source and said second region, said second lead defining a first current path;
 - a resistor; and,
 - a third lead, said third lead and said resistor being connected in series between the other side of said DC source and said first region and defining a second current path, said second current path having a current flow therethrough that changes in response to the flux density level of the light impinging on said third region becoming at least equal to said given flux density level.

2. A photoconductive device as set forth in claim 1 wherein said P-N junction has a given threshold voltage characteristic and wherein a large current flows through said second current path only when said threshold voltage is reached and exceeded.

3. A photoconductive apparatus as set forth in claim 2 wherein said third region is spaced from said second region and including means for encapsulating said second and third regions in a vacuum.

4. A photoconductive apparatus as set forth in claim 2 wherein substantially all of the current from said DC source flows through said second current path when light having a flux density level less than said given level impinges on said third region.

5. A photoconductive device as set forth in claim 2 wherein said second and third regions are contiguous and separated by a P-N junction so as to form a photodiode and wherein for all practical purposes all of the current from said DC source flows through said first current path when light having a flux density level less than said given level impinges on said third region.

6. An apparatus for detecting light from a source having at least a given flux density level comprising, in combination:
 - a photodiode having a surface exposable to said light from said source;
 - a conventional diode having a given threshold conduction voltage, said photodiode and said conventional diode sharing a common cathode whereby they form a unitary structure;
 - a DC source;
 - a resistor;
 - electrically conductive means for serially connecting said DC source and said resistor between the anodes of said photodiodes and said conventional diode, with the anode of said photodiode being connected directly to the negative terminal of said DC source; and,
 - an impedance lead connected so as to couple the common cathode of said photodiode and said conventional diode to the junction between said DC source and said resistor whereby the threshold conduction voltage of said conventional diode is exceeded to cause current to flow through said resistor only when light from said source, impinging on the exposed surface of said photodiode, has a flux density level greater than said given level.

7. A photoconductive device for detecting light having at least a given flux density level consisting of:
 - a generally flat first region having a surface exposable to light from a source to be detected, said first region exhibiting P-type conductivity and photoconductive properties;
 - a generally flat second region having an area substantially larger than the area of said first region, said second region having N-type conductivity, said first and second regions being arrayed in a contiguous manner whereby a P-N junction is formed;
 - a generally flat third region having an area substantially equal to the area of said first region, said third region having P-type conductivity, said second and third regions being arrayed in a contiguous manner whereby an N-P junction is formed;

a front electrode electrically coupled to the outer surface of said first region, said front electrode defining a light responsive target area;

an $N^+$ region formed about the outer edge of said second region;

an edge electrode electrically coupled to said $N^+$ region; and, a back electrode electrically coupled to the outer surface of said third region.

* * * * *